(12) United States Patent
Boyce et al.

(10) Patent No.: US 8,341,860 B2
(45) Date of Patent: Jan. 1, 2013

(54) SIGN POST COMPRISING COMPOSITE MATERIAL

(75) Inventors: Gerard S. Boyce, Ruddington (GB); Nigel A. Finney, Shepshed (GB); Ralph T. Middleton, Hartlepool (GB); Nicholas L. Weatherby, West Bridgford (GB)

(73) Assignee: Frangible Safety Posts Limited, Leicestershire (GB)

( * ) Notice: Subject to any disclaimer, the term of this patent is extended or adjusted under 35 U.S.C. 154(b) by 0 days.

(21) Appl. No.: 12/529,303

(22) PCT Filed: Mar. 10, 2008

(86) PCT No.: PCT/US2008/056382
§ 371 (c)(1),
(2), (4) Date: Nov. 18, 2009

(87) PCT Pub. No.: WO2008/127812
PCT Pub. Date: Oct. 23, 2008

(65) Prior Publication Data
US 2010/0101130 A1    Apr. 29, 2010

(30) Foreign Application Priority Data
Apr. 13, 2007 (GB) .................................. 0707158.2

(51) Int. Cl.
*G09F 15/00* (2006.01)
*B29C 70/08* (2006.01)
*B29C 47/00* (2006.01)
*B29D 22/00* (2006.01)

(52) U.S. Cl. ................... 40/607.01; 428/34.5; 428/34.6; 428/34.7; 428/35.7; 428/36.1; 428/36.3; 156/244.13

(58) Field of Classification Search ........................ None
See application file for complete search history.

(56) References Cited

U.S. PATENT DOCUMENTS

| | | | |
|---|---|---|---|
| 3,429,758 A | 2/1969 | Young | |
| 3,853,418 A | 12/1974 | Druin | |
| 4,939,037 A | 7/1990 | Freeman et al. | |
| 5,996,521 A | 12/1999 | Kitano et al. | |
| 6,746,747 B2 * | 6/2004 | Davies et al. | 428/113 |
| 2002/0061374 A1 | 5/2002 | O'Brien et al. | |
| 2003/0196391 A1 | 10/2003 | Hayes et al. | |

FOREIGN PATENT DOCUMENTS

| | | |
|---|---|---|
| GB | 709251 A | 5/1954 |
| WO | WO9426501 A1 | 11/1994 |
| WO | WO0190504 A1 | 11/2001 |

OTHER PUBLICATIONS

Judith Peake, Search Report for GB 0707158.2, Jul. 20, 2007.
Fabien Jouannon, International Search Report for PCT/US2008/056382, Nov. 27, 2008.
Miracle & S L Donaldson D B, "Pultrusion", ASM Handbook, Composites, 20011201 ASM International, vol. 21, p. 550-563, Dec. 1, 2001.

* cited by examiner

*Primary Examiner* — Camie Thompson
(74) *Attorney, Agent, or Firm* — Chernoff Vilhauer McClung Stenzel LLP

(57) ABSTRACT

The present invention provides a tubular support (12) comprising a composite layer of resin and longitudinal arranged first fibers (66), said tubular support (12) further comprising longitudinal arranged second fibers (68) that are concentrated in discrete domains along the circumference of the tubular support, said second fibers having a Tensile modulus that is higher than the Tensile modulus of said first fibers.

21 Claims, 3 Drawing Sheets

SIGN POST COMPRISING COMPOSITE MATERIAL

CROSS REFERENCE TO RELATED APPLICATIONS

This application is a national stage filing under 35 U.S.C. 371 of PCT/US2008/056382, filed Mar. 10, 2008, which claims priority to Great Britain Application No. 0707158.2, filed Apr. 13, 2007, the disclosure of which is incorporated by reference in its/their entirety herein.

FIELD OF THE INVENTION

The present invention relates to a tubular support, which is based on a composite material. In particular, the invention relates to tubular support posts that can be placed on the side of a street or road for example to hold signs, including traffic signs, lighting, as well as commercial signs.

BACKGROUND OF THE INVENTION

The vast majority of tubular support posts such as sign posts used along streets, roads and motorways are steel tubes. The steel posts are used in various sizes depending on the sign load and application conditions. Typically steel posts are available in standardized sizes and shapes and hence the installation aids to be used with these standard sizes are standardized as well. Steel posts withstand weathering for up to 15 years before they require replacement.

One problem with steel sign posts is that during a vehicle collision, the steel post will generally not give way upon impact. Because the post remains rigid close to ground level, it can penetrate the vehicle. In many cases, the vehicle is already out of control when it hits the post, so can hit it at any angle. This type of impact can result in fatalities and serious injuries to the vehicle occupants, particularly if the impact is side-on. Hence, there exists a desire to find alternative posts that have less potential for causing vehicle damage and less potential for injury. National governments and authorities are continuously attempting to enhance the road safety and increase safety of the road infrastructure. In particular, some authorities have developed passive safety requirements for sign posts used on the side of streets. An example thereof is European Standard EN12767 which classifies sign posts in categories depending on energy on impact at a particular vehicle speed. EN 12767 specifies requirements for passive safety and defines levels in passive safety terms intended to reduce the severity of injury to occupants of vehicles in impact with roadside structures. The levels of passive safety in this standard are defined in terms of High Energy (HE), Low Energy (LE) and Non-Energy (NE), which are determined by measuring the speed of the vehicle at a point beyond impact and comparing with the defined impact speed. The difference in these speeds relates to the energy of impact. Energy absorbing support structures may slow the vehicle considerably and thus the risk of secondary accidents with structures, trees, pedestrians and other road users can be reduced. Non-energy absorbing support structures may provide a lower primary risk of injury caused by the initial impact with the said support structure than energy absorbing support structures. Occupant risk levels are also defined on a scale of 1 to 4, in order of increasing safety. Levels 1-3 for a particular speed class require a test at 35 km/hr and at one of 50, 70 or 100 km/hr and level 4 requires only to be tested at the class speed.

It would now be desirable to develop a tubular support and in particular as a sign post in traffic and which tubular support meets various national standards for passive safety. For example, it should have a non-energy (NE) or a low energy (LE) classification under EN12767 at a speed of impact of 50, 70 or 100 km/hr. An element in achieving this classification is the energy absorbed by the support, when impacted, which should be minimized, i.e. the support should be designed to give way upon impact. Of course it would be desirable to develop such a tubular support in such a way that other performance requirements typically imposed on sign posts can be met as well. In particular, the support is desired to have appropriate stiffness and strength to hold a sign under the expected design loadings resulting from wind pressure on the sign and wind buffeting. It would be desirable to develop posts meeting the requirements of EN12899 and corresponding standards in other countries. It is interesting to note here that typically the desire to have NE or LE classification under EN12767 and the strength and stiffness requirements under EN12899 are competing properties.

For example, in U.S. Pat. No. 4,939,037 there is described a composite sign post for replacing the steel post. The sign post disclosed therein comprises longitudinal and/or transverse arranged fibers in a resin matrix. Typically used and disclosed fibers are glass fibers. However, the problem with a composite sign post based on glass fibers as disclosed in this US patent is that the stiffness performance of such a post will be at the lower end of what is required. While this could be solved by increasing the wall thickness of the post, this would also imply that the passive safety features are reduced, hence illustrating the competition between strength and passive safety. Alternatively, it could be contemplated to increase the diameter of the post but this would likely mean that the size would fall outside the standardized ranges of steel posts with the consequence that installation equipment adapted for use with steel posts cannot be used. Additionally, the size of such a post might contribute to road hazards by unduly obstructing the view of road users, and become aesthetically displeasing. This would likely lead to its rejection by highways authorities.

SUMMARY OF THE INVENTION

Accordingly, it would be desirable to find an alternative composite sign post that combines high strength and good passive safety, preferably at or in the standard steel post size ranges, which for example for circular cross section posts in the UK are 88.9 mm, 114.3 mm and 139.7 mm. In particular it would be desirable to obtain a NE or LE classified composite sign post meeting strength requirements similar to or exceeding those of a steel post of the same dimensions or of a steel post with a one (standard) size down. Hence existing installation equipment should be useable with the composite sign post. It would furthermore be a desired feature that the composite post can be manufactured in an easy and convenient way at minimal cost.

In accordance with one aspect of the present invention there is provided a tubular support comprising a composite layer of resin and longitudinal arranged first fibers, said tubular support further comprising longitudinal arranged second fibers that are concentrated in discrete domains along the circumference of the tubular support, said second fibers having a Tensile modulus that is larger than the Tensile modulus of said first fibers.

In accordance with a further aspect of the present invention there is provided a method of making a tubular support as defined above comprising:

(i) impregnating a series of first and second fibers with resin, said second fibers having a Tensile modulus that is larger than the Tensile modulus of said first fibers and (ii) pulling a series of said first and second fibers through a die, typically a heated die, to provide a desired shape to the tubular support;

wherein the series of first and second fibers are arranged and pulled into the die such that in the resulting tubular support, the second fibers will be concentrated in discrete domains along the circumference of the tubular support.

It has been found that the tubular support posts can be used as supports for supporting signs placed along the side of a road. The term 'road' as used in connection with the present invention is to be understood as including any road designed or intended to be used by vehicles, in particular motor vehicles. Roads include by way of example streets, cycling paths, airport concourses, motorways, freeways and highways.

DETAILED DESCRIPTION OF THE PREFERRED EMBODIMENTS

Figure 1:
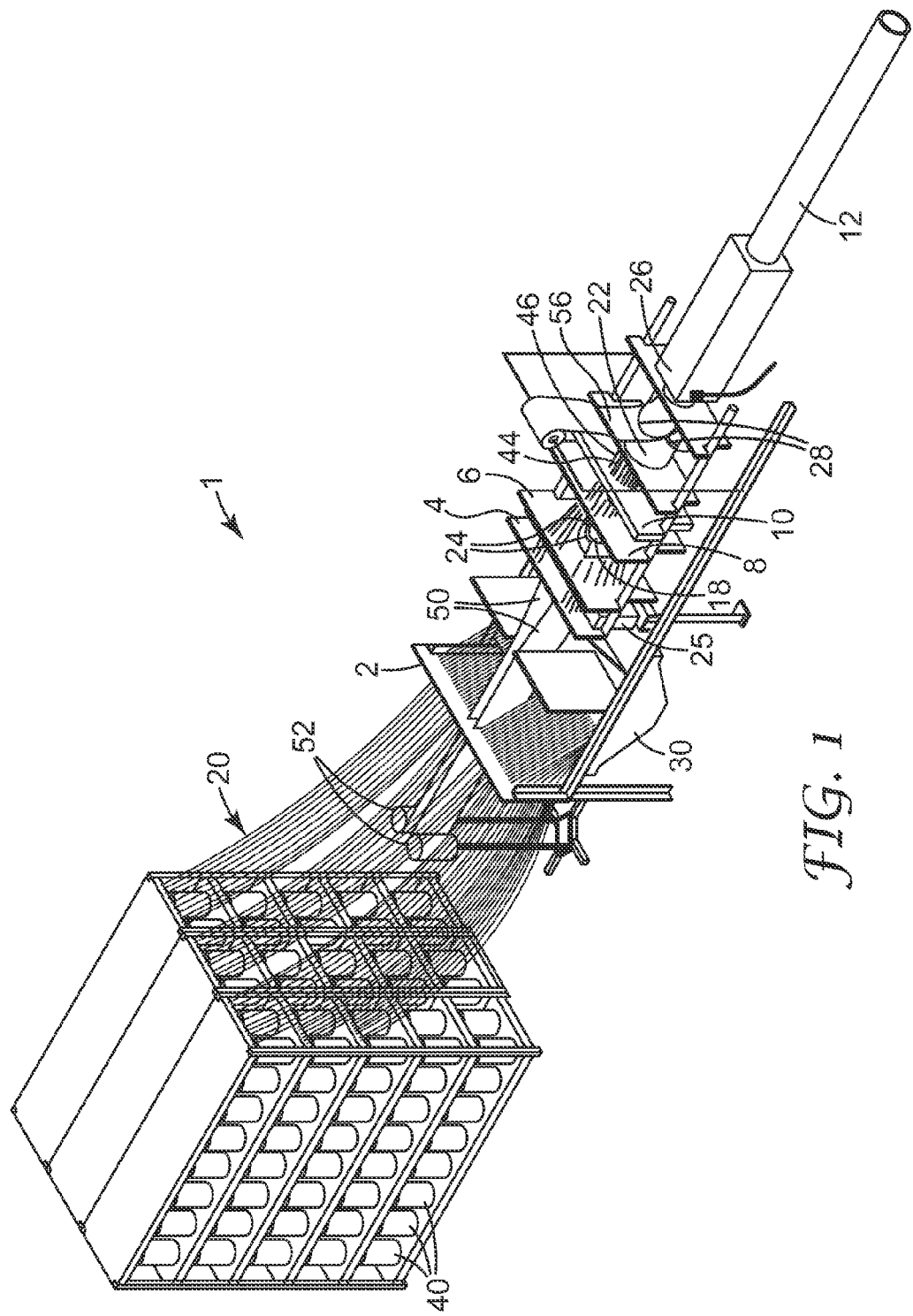
FIG. 1 is a perspective view of an apparatus for making a tubular support.

The tubular supports according to the invention typically meet the strength requirements while providing good to excellent passive safety including LE or NE classifications under EN12767. Typically, the tubular supports should have a good to an excellent flexural modulus that results in a bending moment capacity at deflection as measured under EN12899 that is comparable to that of steel posts of similar dimensions. Hence, the installation equipment typically used with steel posts is useable with the composite tubular supports according to the invention. Furthermore, typically the composite tubular supports can be produced in an easy and convenient way using pultrusion and are cost effective.

The tubular support in accordance with the present invention comprises a composite layer of resin and longitudinal arranged first and second fibers. The second fibers have a Tensile modulus measured according to ASTM Standard D4018-99 (2004) that is larger than the Tensile modulus of the first fibers. Typically, the second fibers have a Tensile modulus that is at least 1.5 times the Tensile modulus of the first fibers. For example, according to one embodiment, the Tensile modulus of the second fibers is between 1.5 and 10 times the Tensile modulus of the first fibers, alternatively between 2 and 8 times the Tensile modulus of the first fibers or between 3 and 6 times the Tensile modulus of the first fibers. According to a particular embodiment, the Tensile modulus of the first fibers is between 50 and 100 GPa, for example between 60 and 90 GPa. In another embodiment, the Tensile modulus of the first fibers is between 65 and 80 GPa. According to a particular embodiment, the Tensile modulus of the second fibers is between 200 and 800 GPa, for example between 150 and 500 GPa. In another embodiment, the Tensile modulus of the second fibers is between 200 and 400 GPa.

Examples of fibers that can be used as first fibers include glass fibers such as E-glass, C-glass, R-glass, S-glass, T-glass, A-glass as well as ECR glass fibers. Basalt may also be used as first fibers. Still further fibers that may be contemplated for use as first fibers include polyester fibers, polyethylene fibers and natural fibers such as reconstituted wood.

Examples of fibers that can be used as second fibers include in particular carbon fibers. Such carbon fibers are available in a range of moduli, e.g. high modulus carbon with a Tensile modulus of 393 GPa and Ultra high modulus carbon with a Tensile modulus of 724 GPa. In one embodiment, carbon fibers are used that are obtained by pyrolysis or a process of oxidation, carbonization and graphitization. For example pyrolyzed carbonaceous fibers that may be used in this invention may be formed in accordance with a variety of techniques known in the art. For instance, organic polymeric fibrous materials which are capable of undergoing thermal stabilization initially may be stabilized by treatment in an appropriate atmosphere at a moderate temperature (e.g., 200° to 400° C.), and subsequently heated in an inert atmosphere to a more highly elevated temperature, e.g., 1500° to 2000° C., or more, until a pyrolyzed carbonaceous fibrous material containing a desired amount of carbon by weight is obtained. Typically fibers will be desired that have at least about 90 percent carbon by weight. The higher the temperature (e.g., within the range of about 2000° to 3100° C.) the more perfect the graphitic structure produced within the same.

The exact temperature and atmosphere utilized during the initial stabilization of an organic polymeric fibrous material commonly vary with the composition of the precursor as will be apparent to those skilled in the art. During the subsequent carbonization reaction elements present in the fibrous material other than carbon (e.g., oxygen and hydrogen) are substantially expelled. Suitable organic polymeric fibrous materials from which the fibrous material capable of undergoing carbonization may be derived include an acrylic polymer, a cellulosic polymer, a polyamide, a polybenzimidazole, polyvinyl alcohol, etc. Acrylic polymeric materials particularly are suited for use as precursors in the formation of graphitic carbonaceous fibrous materials. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

Other fibers that can be used as second fibers include alumina, alumina-zirconia ceramic fibers, stainless steel, and aromatic polyamide fibers including for example KEVLAR™ 49 fibers available from Dupont. Particularly preferred fibers as second fibers are fibers that are relatively brittle, for example those that have a Strain to Failure that is less than the Strain to Failure of the first fibers. For example, in one embodiment, the Strain to Failure of the first fibers is at least 1.5, for example at least twice as large as that of the second fibers. In one embodiment, the Strain to Failure of the first fibers will be between 2 and 8%, for example between 3 and 6%. The Strain to Failure of the second fibers is for example between 0.5 and 3%, for example between 1 and 2.5%. Carbon fibers are particularly preferred in this respect as the second fiber material because it is relatively brittle. The Strain to Failure of Carbon is 1.5%; whereas for E-glass it is 4.5%. The brittleness of the second fibers may further enhance the passive safety because fracturing of the second fibers (e.g. carbon rovings) typically causes longitudinal interlaminar shear in the post, and leads to flexural buckling of the post.

Typically the first and second fibers are used as fiber rovings, i.e. they consist of a bundle of fiber filaments. First fibers typically have a filament diameter between 1 and 40 microns, for example between 5 and 25 microns. First fiber rovings typically have a TEX value of between 100 and 4800, for example between 1200 and 4800. The TEX value is an indication of the linear mass of the fiber filaments in a roving, expressed in g/km. For example, a TEX value of 4800 would mean the linear mass of the roving is approximately 4800 g/km. Commercially available glass fiber rovings that can be used include E-glass rovings available from Saint-Gobain Vetrotex under the brand RO99.

Second fibers typically have a filament diameter between 1 and 12 microns, for example between 5 and 8 microns. Second fiber rovings typically have a TEX value of between 50 and 4000, for example between 800 and 3800. The Tow value is defined as the number of filaments in a tow (or roving). Second fiber rovings typically have a Tow value between 1000 and 50000, for example between 12000 and 50000.

Commercially available carbon fiber rovings that can be used include GRAFIL™ carbon rovings such as GRAFIL™ 34-600WD available from Grafil Inc and PANEX™ 35 available from Zoltec Companies Inc.

The resin for use in the composite layer as a matrix for the longitudinal first and second fibers includes cross-linked resins such as thermoset resins as well as thermoplastic resins. Illustrative examples of suitable thermosetting resins for use in production of the tubular member include epoxy resins, thermosetting polyesters including vinylester resins, phenolics, polyimides, polybenzimidazoles, etc. Particularly suitable thermosetting resins are vinylester resins and epoxy resins. Thermoplastic resins may be melted to impregnate the fibers and set upon cooling, or formed in situ by a catalyzed addition reaction, similarly to thermosetting resins. Illustrative examples of thermoplastic resinous materials include polyamides, polyoxymethylenes, polyolefins (e.g., polyethylene and polypropylene), thermoplastic polyesters or polyurethanes, etc.

The epoxy resin utilized as the resinous matrix material may be prepared by the condensation of bisphenol A (4,4' isopropylidene diphenol) and epichlorohydrin. Also, other polyols, such as aliphatic glycols and novolak resins (e.g., phenol-formaldehyde resins), acids, or other active hydrogen containing compounds may be reacted with epichlorohydrin for the production of epoxy resins suitable for use as the resinous matrix material. Epoxy resins are preferably selected which possess or can be modified to possess the requisite flow characteristics prior to curing.

Numerous reactive diluents or modifiers which are capable of increasing the flow properties of uncured epoxy resins are well known and include butyl glycidyl ether, higher molecular weight aliphatic and cycloaliphatic mono-glycidyl ethers, styrene oxide, aliphatic and cycloaliphatic diglycidyl ethers, and mixtures of the above.

A variety of epoxy resin curing agents may be employed in conjunction with the epoxy resin. The curing or hardening of the epoxy resin typically involves further reaction of the epoxy or hydroxyl groups to cause molecular chain growth and cross-linking The term "curing agent" as used herein is accordingly defined to include the various hardeners of the co-reactant type. Illustrative classes of known epoxy curing agents which may be utilized include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use with the epoxy resin are acid anhydrides (e.g., hexahydrophthalic acid and methylbicyclo [2.2.1]heptene-2,2-dicarboxylic anhydride isomers marketed under the designation Nadic Methyl Anhydride by the Allied Chemical Company), and aromatic amines (e.g., meta-phenylene diamine and dimethylaniline).

Particularly suitable resins for use in connection with this invention include thermoset resins based on vinylesters. An example of vinylester that may be used includes a vinylester based on the condensation of bisphenol A and epichlorohydrin having the following formula:

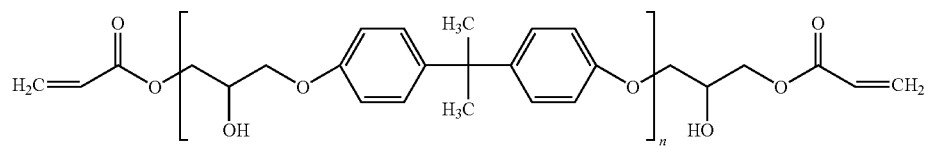

Wherein n is 1 or more, or typically in the range 1 to 5, or preferably 1 or 2.

Typically one or more thermal initiators are mixed with the vinylester to initiate curing of the vinylester resin upon heat activation. Suitable initiators or catalysts include various peroxide curing or cross-linking agents such as bis(4-tert-butyl cyclohexyl)-peroxydicarbonate, tert-butylperoxyneodecanoate, tert-Butyl peroxy-2-ethylhexanoate, 2,5-dimethyl-2,5-bis(2-ethylhexanoylperoxy) hexane, tert-amylperoxy-2-ethylhexanoate, 1,1-di-(t-butylperoxy)-3,3,5-trimethylcyclohexane, tert-butylperoxybenzoate, and di-benzoyl peroxide, which may be used alone or in admixture, and/or bulked with a plasticizer such as dicyclohexylphthalate. Those that activate at a lower temperature may be used as initiators, and may generate heat that leads to activation of other agents in the mixture. A fuller cross-linking is achieved by those agents that operate at a higher temperature, contributing to the rigidity of the physical structure.

The total amount of first and second fibers in the composite layer may vary widely depending on the application and load requirements imposed on the tubular support post. Typically the total combined amount of first and second longitudinal fibers is between 50 and 90% by weight based on the total weight of the tubular support. In one embodiment the amount is between 60 and 90. In yet another embodiment, the amount is between 70 and 90. Generally, the amount of first fibers is larger then the amount of second fibers as the latter are only present in discrete domains across the circumference of the tubular support. For example, the amount of second fibers (expressed as number of fibers) is between 3 and 45% of the amount of first and second fibers, for example between 5 and 40% or between 8 and 35% or between 10 and 30%. Generally a minimum amount of second fibers is included to obtain the desired performance level. Including more second fibers may further improve the performance but typically goes to the cost of the post as second fibers tend to be more expensive than first fibers.

The first longitudinal fibers are typically distributed in a generally uniform way in the composite layer around the circumference of the tubular support. By 'generally uniform' is meant that any two arbitrary sections of the tubular support taken along the circumference of the tubular support show a similar distribution of first longitudinal fibers except for a possible interruption by second fiber domains as described below in accordance with a particular embodiment. Accordingly, except for possible second fiber domains, the composite layer would appear as a continuous or generally continuous layer. Arrangements described in this patent specification as "longitudinal", may include those in a slightly helical path, where the pitch of the helix defined as an angle between the axis of the support and the direction of the roving, can be up to 10 degrees.

The second longitudinal fibers are located or placed in discrete domains distributed along the circumference of the tubular support. By discrete domains is meant that the second fiber rovings are clustered in particular domains along the circumference. Typically these domains would be generally evenly distributed along the circumference although this may not be required in all applications. In one embodiment, the second fibers are distributed in domains located within the composite layer defined by said first fibers and resin. In other words, in this embodiment, the domains of second fibers may interrupt the continuous phase defined by first fibers. Within the composite layer, the domains of second fibers may be located radially outermost whereby the domains only appear towards the radially outermost part of the composite layer. In another embodiment, the domains of second fibers may be placed radially innermost and in yet another embodiment, the domains may appear on both the innermost and outermost part of the composite layer.

In a still further embodiment, the clusters or domains of second longitudinal fiber rovings may be arranged along the circumference of the tubular support in an adjacent layer, in particular a layer contiguous to the composite layer of first longitudinal fibers. Typically such a contiguous layer will be located on the radially outermost side of the composite layer of first longitudinal fibers. Such an arrangement may be achieved through the use of a woven mat having longitudinal second fiber rovings such as for example carbon rovings.

In accordance with a particular embodiment of the present invention, the tubular support may further include two further composite layers arranged on the opposite major sides of the composite layer of first longitudinal fibers. Each of these two further composite layers comprises resin, typically the same resin as used in the composite layer comprising longitudinal first fibers. Further each of these two further composite layers comprise transverse fiber rovings arranged at an angle of between 10 and 80° relative to the longitudinal axis of the tubular support and transverse fiber rovings at an angle of between −10 and −80° relative to the longitudinal axis of the tubular support. In a particular embodiment, each of the further composite layers comprise transverse fiber rovings arranged at an angle of between 30 and 60° relative to the longitudinal axis of the tubular support and transverse fiber rovings at an angle of between −30 and −60° relative to the longitudinal axis of the tubular support. In a yet further embodiment, a third set of transverse fiber rovings may be included in each of the two further composite layers. This third set of transverse fiber rovings will be included at an angle different from the angle of the other two sets of transverse fiber rovings, for example at an angle close to 0°, for example between −5 and 5°.

In a particular embodiment, the transverse fiber rovings of the further composite layers are included in the tubular support as a biaxial (in case of two sets of transverse fiber rovings) or as a triaxial mat (in case of three sets of transverse fiber rovings). Preferably, the mat will comprise of woven fiber rovings that are stitched together to maximize dimensional stability and to reduce fraying. Typically, woven mats can be used that have a fabric nominal weight of 200 to 2000 g/m$^2$, for example 300 to 1500 g/m$^2$.

Fibers that may be used for the transverse fibers include any of the fibers mentioned above for the first or second longitudinal fibers. Particularly preferred are glass fiber rovings including E-glass, C-glass, R-glass, S-glass, T-glass, A-glass as well as ECR glass fibers.

The fiber rovings of the transverse fibers consist of a bundle of fiber filaments. The transverse fibers typically have a filament diameter between 1 and 40 microns, for example between 5 and 25 microns. Transverse fiber rovings typically have a TEX value of between 100 and 4800, for example between 1200 and 4800. The transverse fiber rovings typically are comprised in the tubular support in an amount of 10 to 40% by weight of the total weight of the tubular support, for example between 12 and 30% by weight of the total weight of the tubular support. The use of the composite layers of transverse fibers on both opposite major sides of the composite layer of longitudinal fibers typically improves the strength of the tubular support. For example transverse stiffness and the torsional rigidity are increased. Accordingly, the tubular support will be particularly useful for use as a post for holding a sign. Thus, the strength of the post can be improved such that a post meeting the required strength under various conditions of loading can be obtained or designed with dimensions that are close to the external dimensions of a steel post designed for use under the same loading conditions. This then allows the use of typical and standard installation equipment normally used in conjunction with steel posts.

In a particular embodiment in connection with the present invention a composite layer of resin and randomly chopped fibers is included between each of the composite layers of transverse fibers and the composite layer of first longitudinal fibers. The use of these additional composite layers of randomly chopped fibers may offer the advantages of maximising the load transfer and increasing the interlaminar shear strength between the composite layer with longitudinally arranged fibers and the layer of transversely arranged fibers. In a particularly preferred embodiment, the randomly chopped fibers are included by stitching them to a woven mat of the transverse fibers. Suitable fibers for use as chopped fibers include any of the fibers mentioned above but generally include chopped glass fibers. The length of the chopped fibers may vary widely but is typically between 1 and 260 mm, for example between 25 and 100 mm. The diameter of the chopped fibers may also vary widely but is typically between 1 and 40 microns or between 5 and 25 microns.

Generally the layer of chopped fibers has a weight between 20 and 600 g/m$^2$, for example between 100 and 300 g/m$^2$. The amount of chopped fibers in the tubular support is typically between 1 and 10% by weight of the total weight of the tubular support, for example between 3 and 7% by weight.

The tubular support may further include a veil as outermost and innermost layer to impart a desired look and feel to it, and enhance durability and wear resistance. The tubular support according to the present invention is elongated and has a hollow core. The cross-section of the tubular support may comprise any suitable shape including circular, oval, square, rectangular or combinations thereof such as semi-circular combined with a rectangular portion. The cross-section may also vary along the tubular support and likewise can the dimensions thereof vary along the tubular support. For example, in one embodiment, the tubular support may taper along its length.

The skilled person using constructions of support described in this patent specification will be able to select a thickness of support that provides for the chosen diameter the required stiffness to comply with standards, whilst optimizing the strength and impact resistance through choice of materials making up the construction to achieve the required passive safety. The tubular support is particularly suitable for the support of lighting fixtures, traffic control indicia, utility lines, and the like. Such tubular supports are typically arranged alongside of a road. The tubular support according to the invention can exhibit high strength characteristics under static conditions making it suitable for use to support traffic signs or any other type of signs, cameras and the like that are being placed on the side of a road. A tubular support for use alongside of a road may be installed at the side of the road by securing its lower end in a substantially vertical position in a mounting means adjacent a road. The mounting means is typically structured so that it exhibits no substantial impediment to the movement of a vehicle. For instance, the mounting means may comprise a socket of concrete or other durable material which appreciably does not extend above ground level and which engages the lower end of the tubular member.

When a vehicle which inadvertently has left the road strikes the tubular support, the possibility of bodily injury and vehicular property damage is minimized. The tubular support readily undergoes catastrophic rupture when struck by a moving vehicle because of its low impact strength. Little energy is consumed upon impact and the rate of movement of the vehicle may be altered only moderately.

The tubular support according to the present invention may offer significant advantages. Unlike wooden or metallic poles, the supports of the present invention readily may be handled and moved without resorting to complex equipment, and are of lighter weight. The combination of properties exhibited by the tubular support enables the support reliably to withstand normal environmental conditions such as wind, precipitation, etc. Upon impact, the tubular member easily ruptures. Furthermore, the buckling that typically occurs when the support is hit by a vehicle allows the vehicle to impart little energy to the support, and may cause the support to undergo longitudinal failure in such a way that signs or other hardware attached to it by clamps may be released and slide off the support. In addition for certain embodiments of the invention, the energy imparted to the sign or other hardware may be so small that it drops to the ground without becoming another hazardous projectile in the accident.

The tubular support according to the present invention may be made by pull-winding, filament-winding, vacuum infusion, or a variety of other processes. However, it is preferably produced by pultrusion. This process is relatively cheap, produces continuous lengths of tubular support and provides a tubular support with reproducible straight and parallel sides. Accordingly, a method of making the tubular support comprises (i) impregnating a series of first and second fibers with resin and (ii) pulling a series of continuous first and second fibers through a die to provide a desired shape to the tubular support. When a thermosetting resin is used, the die will typically be a heated die. However, in case of a thermoplastic resin, the die would not need to be a heated die. The die may include a die with a fixed internal diameter and a centrally cantilevered mandrel of lesser external diameter, between which the tubular support is formed. The series of first and second fibers are arranged and pulled into the die such that in the resulting tubular support, the second fibers will be concentrated in discrete domains along the circumference of the tubular support. The first fibers are typically arranged such that they will be distributed generally uniformly along the circumference of the tubular support as already described above. The fibers are typically impregnated by pulling the fibers through a resin bath that includes the resin composition. Alternatively, the resin composition may be injected into the die in order to impregnate the first and second fibers. In a preferred embodiment, the resin composition used for the impregnation is a thermoset resin and the resin is cured or caused to cure in the die.

In case optional further fiber layers are to be included in the construction of the tubular support, they will likewise be pulled through the heated die. For example, in a particular embodiment, a composite layer of transverse fibers is included on both opposite major sides of the composite layer of longitudinal first fibers. This can be conveniently achieved by providing a woven mat, for example a biaxial mat or triaxial mat, supplying a pair of mats through angled vertical slots in a die as described later so as to form a cylindrical layer e.g. by pulling around a mandrel. The first and second fibers are then arranged around this cylindrical mat layer. The second layer of transverse fibers can then be obtained by supplying a further pair of mats by pulling them through a further die via angled transverse slots as described later thereby forming a cylindrical mat layer around the first and second fibers. This whole arrangement of first and second fibers and mats of transverse fibers may then be pulled through the die. Also, this arrangement will be impregnated in a resin bath as described above or may alternatively be impregnated with resin by injection of resin in the die. If layers of chopped fibers are to be included as well, it will be preferred to stitch bond them to the mat of transverse fibers.

In FIG. 1, an apparatus and method of making a tubular support according to a particular embodiment of the present invention is illustrated. As shown in FIG. 1, a pair of mats (50) provided from rolls (52) are fed through pairs of vertical slots in an anterior carding frame (2) and then through the first and second carding frames (4,6) and directed through angled vertical slots (24) in a die (18) to the interior thereof, for example a plastic die such as a polypropylene die, positioned between the second and third carding frames (6,8) where they are wrapped around the cantilevered mandrel which provides the internal shape of the tube. The cantilevered mandrel is supported on a rigid mounting (25) and extends from the mounting point all the way through to the exit end of the die (26). Generally the width of the mats will be such that enough overlap occurs between the mats, thereby forming a cylindrical mat layer. This cylindrical layer will form a mat of transverse fibers on the inside of the final tubular support.

First and second fiber rovings (20) are fed from racks of bobbins (or creels) (40) through holes in the anterior carding frame (2) positioned to direct them through the resin composition bath (30), then while retaining a soaking of resin from the bath through a succession of carding frames (4,6,8,10) with holes to arrange the rovings into the desired three concentric cylindrical arrays to form the longitudinal reinforcement of the tubular support. The inner two cylindrical arrays are of first fiber rovings, and the outermost cylindrical array comprises a combination of first and second fiber rovings. Between the second and third carding frames (6,8), first fiber rovings are guided over the cylindrical layer transverse fiber mat. The next array of first fiber rovings is added between the third and fourth carding frames (8,10). After the fourth carding frame (10) the remaining combination of second fiber rovings (44) and first fiber rovings (46) is guided into the entrance of a pre-forming die (22). Any excess resin on the rovings may be squeezed out during entry into the pre-forming die. A second pair of mats of transverse fibers (upper mat, 56) provided from rolls (upper roll, 54) are fed through a pair of angled transverse slots (28) in the pre-forming die (22) to provide an overlapping cylindrical wrap of mat of transverse fibers around the outermost rovings. The entire composite construction may then be cured by passing into a metal die (26) heated near its entrance. The die may be heated to any desired our required temperature to cause setting of the resin composition. Typically, the temperature for curing will be between 100° C. and 200° C. Following curing, the resulting tubular support can be drawn from the die using grippers. Varying combinations of mandrel external diameter and/or shape, die internal diameter and/or shape, number and width of internal and external mats and the total number of first and second fiber rovings provide flexibility in the shape, diameter and wall thickness of the tubular post to be produced.

Figure 2:
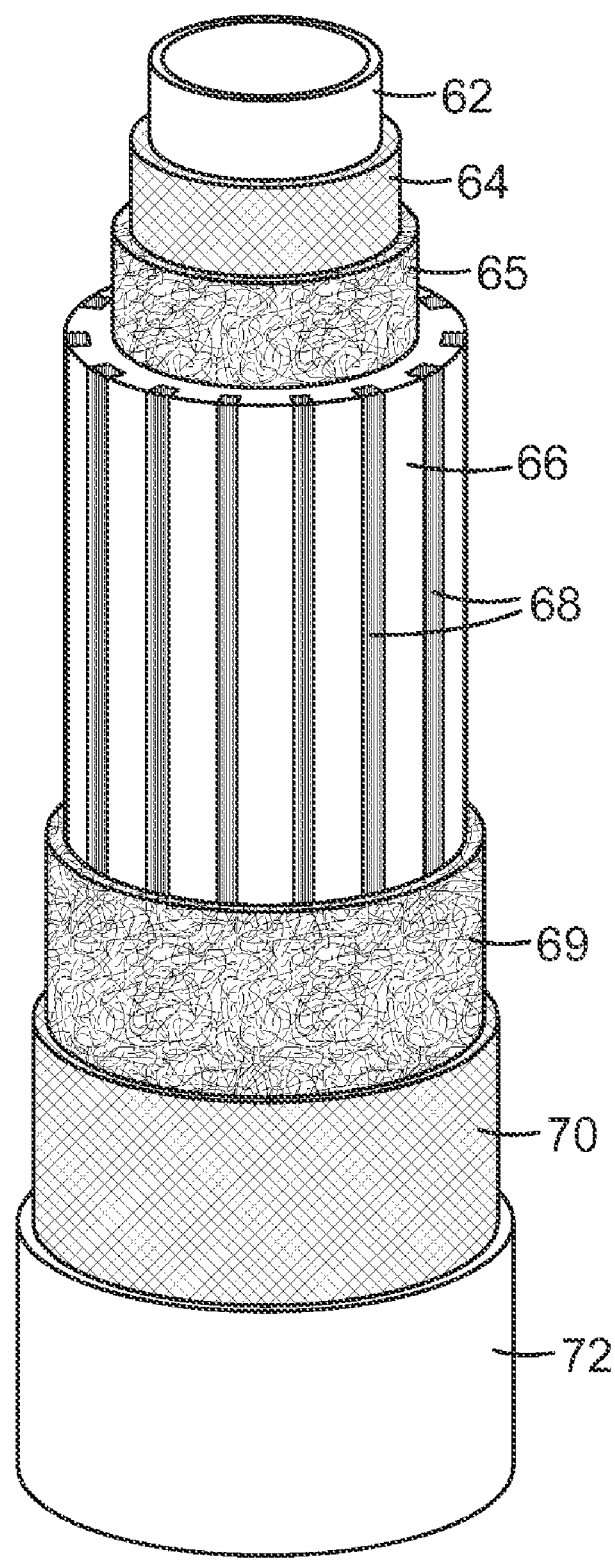
FIG. 2 illustrates a tubular support that may be manufactured using the apparatus shown in FIG. 1.

FIG. 2 illustrates an embodiment of a tubular support according to the present invention as it may result from the process described above in connection with FIG. 1. The tubular support of FIG. 2 consists of the following layers starting from the inside and working outwards: inner surface veil and resin layer (62), inner biaxial mat (64) with random chop strand mat (65), longitudinal first fiber rovings (66), longitudinal second fiber rovings (68), random chop strand mat (69) with outer biaxial mat (70), outer surface veil and resin layer (72). The inner biaxial mat and chop strand mat layer (64,65) is formed from mats (50). The outer biaxial mat and chop strand mat layer (70,69) is formed from mats (56). As can be seen from FIG. 2, the second fiber rovings are concentrated in domains that are distributed along the circumference of the tubular support. These domains are generally distributed in a regular way along the circumference.

The invention will now be further illustrated with reference to the following examples in the following experimental section without however the intention to limit the invention thereto.

EXPERIMENTAL SECTION

Materials a. Fibers

E-glass rovings—4800 TEX roving has 4800 filaments of 24 micron diameter, available from Saint-Gobain Vetrotex UK Ltd., Unit 2, Thames Park, Lester Way, Wallingford, Oxfordshire, OX10 9TA, UK. The tensile modulus of the filaments is 69 Gpa.

Carbon rovings (otherwise known as tows)—PANEX 35 (50 k Tex) available from Zoltec Companies Inc., 3101 McKelvey Road, St. Louis, Mo., MO63044, USA. The diameter of the filaments is 7.2 microns and the tensile modulus of the filaments is 242 Gpa.

b. Mats

For Pultrusion examples—Mats comprising +/−45° Biaxial E-glass (600 g/m²), the E-glass being the same filament as used in the rovings, and having Random orientation chop mat (225 g/m²), the chopped fibers being E-glass of length 25-75 mm and diameter 24 microns, stitched onto one side of the mat.

c. Polymers

Resin:

ALTAC 580 vinyl ester thermoset resin, available commercially from DSM Composite Resins AG, PO Box 1227, 8207 Schauffhausen, Switzerland.

d. Additives

Filler (or low profile additive)—Microdol Extra, available from Euroresins UK Ltd., Cloister Way, Bridges Road, Ellesmere Port, Cheshire CH65 4EL, UK. Coathylene HA 1682, available from DuPont.

Catalyst—Perkadox CH-50-X, Triganox 29-B-50 and Triganox C, available from Akzo Nobel Pigment—Neolite RAL 7001, available from Euroresins UK Ltd, (address as above)

Lubricant—Zinc Stearate available from FACI Spa (UK), Ashcroft Road, Knowsley Industrial Par, Liverpool, L33 7TW, UK.

e. Resin Composition

For Pultrusion examples—a thermosettable vinyl ester resin composition was prepared by combining:

80 wt % vinyl ester resin,
    16 wt % Microdol Extra filler
    1.0 wt % Coathylene HA 1682
    1.0 wt % catalyst
    0.8 wt % Styrene
    0.5 wt % PAT 654/M mould release
    0.5 wt % Zinc Stearate
    0.2 wt % Neolite RAL 7001 pigment The components were mixed together and stirred until homogeneous. The mixture was then poured into a resin composition bath.

Test Methods

The following tests were conducted using the basic principles of the standards indicated, but were adapted to suit the nature of the samples being tested:

Flexural Modulus and Strength—Based Upon ASTM D790.

Gutter-shaped pieces referred to as 'Coupons' of dimensions b×1, where 1 is measured longitudinally, were cut from the post to be tested.

| Thickness (h) | 5.2 mm |
| --- | --- |
| Width (b) | 20 mm |
| Length (l) | 104 mm |

Each piece was mounted in an Instron 5500R tensile testing machine so that it rested across 2 parallel support bars of span S. A third parallel bar was brought down at 2.1 mm/min midway between the support bars, and the load recorded against distance/time.

Support span (S) 80 mm

Flexural Strength is given by the following equation:

$$\sigma_f = 3 P_f S / 2 b h^2$$

$\sigma_f$ Flexural Strength
$P_f$ Maximum Load Observed (N)

Flexural Modulus is given by $$E_f = S^3 m / 4 b h^3$$

$E_f$ Flexural Modulus
m Slope of the tangent to the initial straight-line portion of the load-deflection curve Interlaminar Shear Strength—Based Upon Bs En ISO14130.

Gutter-shaped pieces referred to as 'Coupons' of dimensions b×1, where 1 is measured longitudinally, were cut from the post to be tested.

| | |
|---|---|
| Sample width (b) (=5 h) | 26 mm |
| Sample thickness (h) | 5.2 mm |
| Sample length (l) (=10 h) | 52 mm |
| Support span (S) (=5 h) | 2 mm |
| Strain rate | 1 mm/min |

Each piece was mounted in an Instron 5500R tensile testing machine so that it rested across 2 parallel support bars of span S. A third parallel bar was brought down at 1 mm/min midway between the support bars, and the load recorded against distance/time.

Interlaminar Shear Strength is calculated as follows:

$$F^{sbs} = 0.75 \times P_m)/(b \times h)$$

$F^{sbs}$ Interlaminar Shear Strength (MPa)
$P_m$ Maximum load observed (N)

Energy is calculated by integrating the area under the curve of load (N) v extension (mm) from the origin to the point of interlaminar failure, and expressing as Joules. Extension is the distance (mm) from initial load to the point of interlaminar failure.

Bending Moment Capacity at Deflection Limit (KNm)—to the Requirements of EN12899

A length of post was suspended horizontally, such that a length of 4 metres was cantilevered. Weights were applied to the cantilevered end until a deflection of 200 mm (50 mm per metre of cantilevered post). The bending moment was calculated from the weight (kN) multiplied by the cantilevered length (m). The apparent flexural modulus was calculated from bending moment theoretically, using MITCalc software available on-line at http://www.mitcalc.com or from 1 ng. Miroslav Petele; Stolicni 1205/6; 405 01 Decin; Czech Republic.

Crash Test According to EN12767
Certified Test

Passively Safe Performance was tested to standard EN12767 by the Transport Research Laboratory, Wokingham, UK. A 5 metre length of post was planted in a 1 metre hole of diameter 300 mm filled with sharp sand compacted every 300 mm. A sign of dimensions 2 m tall×1 m wide, weight 18.5 kg, was mounted on the post with the bottom edge 2 m above ground. A Ford Fiesta 1.1 l 3-door hatchback (1988 model) was adapted for use by adjusting the mass and installing accelerometers in the vehicle. Its gross static mass (938 kg) included ballast adjustment 64 kg to position centre of gravity at 977 mm behind front axle, 451 mm above ground and 5 mm to the right of centre. Thus the vehicle was in compliance with sect. 6.2 of the standard. It was towed by chains attached to continuous loop steel cable attached to a computer controlled hydraulic propulsion system. Just before impact, the chains were detached allowing the vehicle to freewheel into the planted post, the plane of the sign being at an angle of 20 degrees relative to a plane normal to the direction of travel. The performance was tested at 35 km hr$^{-1}$ and at 100 km hr$^{-1}$.

Uncertified Test

Passively Safe Performance standard EN12767 by the Transport Research Laboratory, Wokingham, UK. A 4 metre length of post was planted in a 1 metre hole, and a sign 1 metre×1 metre mounted 2 metres above ground. A Ford Fiesta diesel hatchback, modified to have the same inertial mass as the vehicle in the certified test above, was driven at the planted post. The performance was tested at 35 km hr$^{-1}$ and at 100 km hr$^{-1}$.

Apparatus

A pultrusion apparatus, available as Pultrex P8000 from Pultrex Ltd, The Octagon 27 Middleborough, Colchester, Essex CO1 1PD, UK, was employed.

The apparatus is of a scale able to produce a pipe having an outside diameter of 139.7 mm and a wall thickness of 5.2 mm, or similar sizes by incorporating different sizes of die or mandrel. The resin composite throughput is of the order of 75 kg per hour.

EXAMPLES

Figure 3:
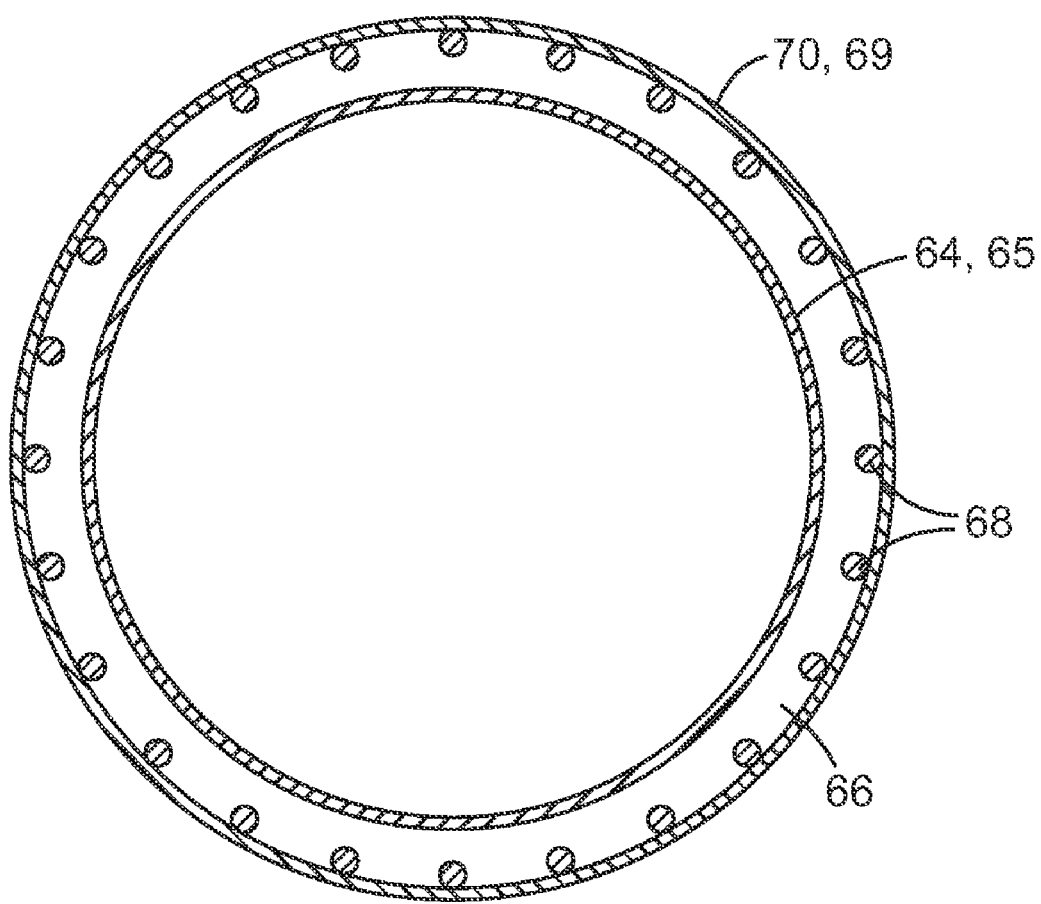
FIG. 3 is a sectional view of an example of a support similar to that shown in FIG. 2 but omitting the inner layer and outer layer of the support shown in FIG. 2.

The examples were prepared by pultrusion using the apparatus specified above and the process described earlier. In the construction (FIG. 2), both veils (62,72) were omitted. Otherwise the examples were prepared as in FIG. 2. The location of the carbon tows (68) is on the outermost circumference of the longitudinal fiber composite i.e. the third concentric cylindrical array, distributed regularly in bundles. To maintain the volume of the cylindrical layer, where more carbon tows were prescribed, a corresponding number of glass rovings were omitted. An example of this is shown in FIG. 3. Thus where the table of examples refers to "24, 5×2 and 3", this represents 5 bundles with 2 tows followed by a bundle with 3 tows. This is repeated four times to give 24 bundles regularly distributed about the circumference. FIG. 3 also shows the positions of the inner mat (64,65), the outer mat (70,69) and the longitudinal glass rovings (66).

Comparative example C1 was made as above with the exception that carbon tows were not included.

Comparative example S1 relates to a steel post of diameter 113.9 mm and wall thickness 3.2 mm, which corresponds to the next smaller standard size of post than the examples in the UK. The values given were determined theoretically from established data.

Details of the examples and of the results of testing to Standard EN 12899 are provided in Table 1a. Details of the examples and of the results of testing to Standards ASTM D790 and ISO 14130 are provided in table 1b. Results of Crash testing to EN 12767 of examples 1 and 2 are given in tables 2a and 2b respectively.

TABLE 1a

| | Longitudinal fibers | | | | | |
|---|---|---|---|---|---|---|
| Example | Volume % carbon relative to volume of the uni-directional layer | Weight % Carbon relative to weight of uni-directional tows and rovings | Location of carbon tows (no. of bundles arranged circumferentially, no. of tows per bundle) | Post samples - BS EN12899 apparent flexural modulus (GPa) | Post samples - BS EN12899 bending moment at 50 mm/m deflection (kNm) | Number of measurements |
| 1 | 10 | 7.57 | 24, 5 × 2 and 3 repeated 4 times | 33.03 | 7.13 | 4 |

TABLE 1a-continued

| | Longitudinal fibers | | | | | |
|---|---|---|---|---|---|---|
| Example | Volume % carbon relative to volume of the uni-directional layer | Weight % Carbon relative to weight of uni-directional tows and rovings | Location of carbon tows (no. of bundles arranged circumferentially, no. of tows per bundle) | Post samples - BS EN12899 apparent flexural modulus (GPa) | Post samples - BS EN12899 bending moment at 50 mm/m deflection (kNm) | Number of measurements |
| 2 | 20 | 15.56 | 24, 5 × 4 and 6 repeated 4 times | 35.50 | 7.5 | 1 |
| 3 | 20 | 15.56 | 48, 5 × 2 and 3 repeated twice | 34.25 | 7.7 | 1 |
| C1 | 0 | 0 | n/a | 29.77 | 6.22 | 5 |
| S1 | n/a | n/a | n/a | Typical value 200 | Typically 6.45 - see footnote | n/a |

For steel the bending moment is determined at 25 mm/m deflection.

TABLE 1b

| | Longitudinal fibers | | | Coupon samples - ISO 14130 | | | | Coupon samples - ASTM D790 | | |
|---|---|---|---|---|---|---|---|---|---|---|
| Example | Volume % carbon tows relative to volume of the uni-directional layer | Weight % Carbon relative to weight of uni-directional tows and rovings | Location of carbon tows (no. of bundles arranged circumferentially, no. of tows per bundle) | Interlaminar shear (MPa) | Energy (J) | Extension (mm) | Number of measurements | flexural modulus (GPa) | Flexural strength (MPa) | Number of measurements |
| 1 | 10 | 7.57 | 24, 5 × 2 and 3 repeated 4 times | 33 | 4.34 | 1.46 | 15 | 27.8 | 589 | 18 |
| 2 | 20 | 15.56 | 24, 5 × 4 and 6 repeated 4 times | 34 | 4.31 | 1.43 | 15 | 28.6 | 605 | 18 |
| 3 | 20 | 15.56 | 48, 5 × 2 and 3 repeated twice | 32 | 5.15 | 1.63 | 14 | 29.0 | 625 | 18 |
| C1 | 0 | 0 | n/a | 38 | 5.90 | 1.74 | 14 | 25.5 | 587 | 18 |

TABLE 2a

Example 1

| Nominal impact speed (km hr$^{-1}$) | Entrance Speed (km hr$^{-1}$) | Exit Speed (km hr$^{-1}$) | Classification and Occupant safety level |
|---|---|---|---|
| 100 | 98 | 89 | NE 3 |
| 35 | 34 | — | NE 2 |

TABLE 2b

Example 2

| Nominal impact speed (km hr$^{-1}$) | Entrance Speed (km hr$^{-1}$) | Exit Speed (km hr$^{-1}$) | Classification |
|---|---|---|---|
| 100 | 98.08 | 95.87 | NE |
| 35 | 33.7 | 24.7 | LE |

Upon examination of the post after impact at 35 km hr$^{-1}$, it was found that the rovings had separated from the resin composite, and some of them had fractured. This was visible through the torn outer mats.
NE = Non-energy absorbing
LE = Low energy absorbing

The invention claimed is:

1. A tubular support comprising a composite layer of resin and longitudinal arranged first fibers, said tubular support further comprising longitudinal arranged second fibers that are concentrated in at least 24 discrete domains along the circumference of the tubular support, said second fibers having a Tensile modulus that is higher than the Tensile modulus of said first fibers, and a strain to failure that is less than the strain to failure of the first fibers such that the tubular support is operable to give way upon impact.

2. A tubular support according to claim 1 wherein said second fibers are arranged longitudinally in said composite layer or are arranged contiguous to said composite layer on at least the radially outermost side of said composite layer.

3. A tubular support according to claim 1 wherein said first fibers are generally uniformly distributed within said composite layer along the circumference of said tubular support.

4. A tubular support according to claim 1 wherein the Tensile modulus of said first fibers is between 50 and 100 GPa and the Tensile modulus of said second fibers is between 150 and 800 GPa.

5. A tubular support according to claim 1 wherein said first fibers comprise glass fibers and said second fibers comprise carbon fibers.

6. A tubular support according to claim 1 wherein the total amount of first and second fibers is between 50 and 90% by weight based on the total weight of the tubular support.

7. A tubular support according to claim 1 wherein on opposite major sides of said composite layer are provided two further composite layers, each of said further composite layers comprising resin, transverse fibers at an angle of between 30 and 60° relative to the longitudinal axis of said tubular support and transverse fibers at an angle of between −30 and −60° relative to the longitudinal axis of said tubular support.

8. A tubular support according to claim 7 wherein said transverse fibers of said further composite layers are provided as a mat.

9. A tubular support according to claim 8 wherein the amount of second fibers is between 3 and 45% of the amount of first and second fibers.

10. A tubular support according to claim 9 wherein the amount of second fibers is between 10 and 30% of the amount of first and second fibers.

11. A tubular support according to claim 7 wherein said transverse fibers are glass fibers.

12. A tubular support according to claim 7 wherein there is provided between said composite layer and said two further composite layers, a layer of resin and randomly oriented chopped fibers.

13. A tubular support according to claim 12, wherein said chopped fibers are glass fibers.

14. A tubular support according to claim 7 wherein said resin of said composite layer comprises a cross-linked resin.

15. A tubular support according to claim 1 wherein the support is substantially uniform in external dimension and wall thickness.

16. A tubular support according to claim 1 supporting a sign.

17. A method of making a tubular support as defined in claim 1 comprising:
   (i) impregnating a series of first and second fibers with resin, said second fibers having a Tensile modulus that is higher than the Tensile modulus of said first fibers and a strain to failure that is less than the strain to failure of the first fibers, and
   (ii) pulling a series of said first and second fibers through a die to provide a desired shape to the tubular support;
   wherein the series of first and second fibers are arranged and pulled into the die such that in the resulting tubular support, the second fibers will be concentrated in at least about 24 discrete domains along the circumference of the tubular support.

18. A method according to claim 17 wherein the series of first and second fibers are arranged and pulled into the die such that in the resulting tubular support, the second fibers will be concentrated in up to about 48 discrete domains distributed substantially uniformly along the circumference of the tubular support.

19. A tubular support according to claim 1 wherein the strain to failure of the first fibers is at least 1.5 times as large as the strain to failure of the second fibers.

20. A tubular support according to claim 1 wherein the strain to failure of the first fibers is between 3 and 6% and the strain to failure of the second fibers is between 1 and 2.5%.

21. A tubular support according to claim 1 wherein the second fibers are concentrated in up to about 48 discrete domains distributed substantially uniformly along the circumference of the tubular support.

* * * * *